(12) United States Patent
Canada et al.

(10) Patent No.: US 6,546,236 B1
(45) Date of Patent: Apr. 8, 2003

(54) PHASE-COMPENSATING POLARIZATION DIVERSITY RECEIVER

(75) Inventors: Robert O. Canada, Forest, VA (US); Walter D. Rawle, Lynchburg, VA (US)

(73) Assignee: Ericsson Inc., Research Triangle Park, NC (US)

(*) Notice: Subject to any disclaimer, the term of this patent is extended or adjusted under 35 U.S.C. 154(b) by 830 days.

(21) Appl. No.: 08/910,297

(22) Filed: Aug. 11, 1997

(51) Int. Cl.[7] ................................. H04B 1/10
(52) U.S. Cl. .................... 455/304; 455/276.1; 455/506; 455/278.1
(58) Field of Search .................... 455/272, 273, 455/276.1, 303, 304, 334, 504, 506, 65, 137, 139, 278.1, 279.1, FOR 110–114; 343/797, 895, 756; 375/347; 333/21 A; 342/362

(56) References Cited

U.S. PATENT DOCUMENTS

| 4,186,347 A | | 1/1980 | Frosch | 455/136 |
| 4,313,220 A | * | 1/1982 | Lo et al. | 455/304 |
| 5,263,180 A | | 11/1993 | Hirayama et al. | 455/139 |
| 5,392,054 A | | 2/1995 | Botomley et al. | 343/702 |
| 5,513,222 A | * | 4/1996 | Iwasaki | 455/137 |
| 5,568,158 A | * | 10/1996 | Gould | 343/756 |
| 5,923,714 A | * | 7/1999 | Hwang | 455/304 |

FOREIGN PATENT DOCUMENTS

| EP | 0637878 A2 | 2/1994 | H04B/7/08 |
| EP | 0661834 A2 | 12/1994 | H04B/7/08 |

* cited by examiner

Primary Examiner—Vivian Chin
Assistant Examiner—James K Moore
(74) Attorney, Agent, or Firm—Coats & Bennett, P.L.L.C.

(57) ABSTRACT

A receiver and an associated method are disclosed for combining signals having substantially different polarizations. The receiver is used with a first antenna which receives first polarized signals and a second antenna which receives second polarized signals, the first polarized signals having a substantially different polarization than the second polarized signals. The receiver includes a phase shifter and a combiner circuit. The phase shifter adjusts the phase of the first polarized signal in response to the phase of the second polarized signal to produce a phase compensated first signal. The combiner circuit sums the second polarized signal and the phase compensated first signal to generate a combined polarization received signal. In this manner, the depolarized signals are phase-aligned with, and then combined with, the polarized signals to provide a strong received signal irrespective of any depolarization of the received signal.

15 Claims, 2 Drawing Sheets

PHASE-COMPENSATING POLARIZATION DIVERSITY RECEIVER

FIELD OF THE INVENTION

The present invention relates to a receiver in a wireless communication system, and more particularly, to a polarization diversity receiver which aligns the phase of received cross-polarized signals and combines the received signals to generate an enhanced received signal.

BACKGROUND OF THE INVENTION

In wireless communications systems, transmitted signals become substantially degraded before being received by a receiver. Received signals are a combination of the transmitted signal along a direct path between the transmitter and receiver as well as reflections of the transmitted signal by intervening objects such as terrain and buildings and atmospheric conditions such as inverse gradients of relative humidity and temperature.

The orientation of the electric field vector of the transmitted signal is referred to as the signal's polarization. The polarization of the transmitted signal changes as it is reflected to the receiver. Due to reflections, the received signal can become orthogonally polarized to the transmitted signal. The strength of a signal which is received by an antenna is highest when the received signal has the same polarization (i.e. co-polarized) as the antenna and becomes substantially zero when the received signal is orthogonally polarized to the antenna. Consequently, depolarization of the transmitted signal can result in signal "holes" where the signal strength drops below a minimum threshold of reception by the receiver.

To compensate for depolarization of the transmitted signal, some receivers are coupled to a pair of antennas which have orthogonal polarizations, such as linear polarizations (e.g. horizontal and vertical), elliptical polarizations (e.g. horizontal and vertical major axes), or circular polarizations (e.g. right circular and left circular). The phase centers of the antennas can be co-located so that only one antenna structure is needed on the receiver. Improved signal reception is provided by the receiver selecting and then processing the strongest one of the two signals from the antennas.

Multiple reflections of a transmitted signal constructively and destructively superpose at the receiver according to the relative phase and amplitude of all of the reflected signals. The interaction of reflected signals produces both strong peaks (local maximums) and deep nulls (local minimums) of relative signal strength relative to different locations of the receiver. As with depolarization of the transmitted signal, multipath relections of the transmitted signal can result in signal "holes" where the signal strength drops below the minimum reception threshold of the receiver. Depending on the relative phase of the interacting signals, the peaks and nulls of signal strength are generally separated by a fraction of the wavelength of the carrier frequency of the transmitted signal.

To compensate for multipath signal fading, some receivers are coupled to a pair of antennas which are separated by a minimum of one half of a wavelength of the carrier frequency of the transmitted signal. By separating two receiving antennas by the appropriate distance, each antenna receives a signal whose fading pattern can be uncorrelated with the fading pattern of the signal received by the other antenna. As with polarization diversity reception, improved signal reception is provided by the receiver selecting and then processing the strongest one of the two signals from the antennas.

By selecting and processing only the strongest one of the two signals which are received by the antennas, the electromagnetic energy of the weaker signal is discarded. Consequently, the strength of the received signal continues to be limited by depolarization and multipath effects on the transmitted signal.

SUMMARY OF THE INVENTION

The present invention is directed to a receiver and an associated method which provides a strong received signal irrespective of any depolarization of the received signal. The receiver is used with a first antenna which receives first polarized signals and a second antenna which receives second polarized signals, where the first polarized signals have a substantially different polarization than the second polarized signals.

The receiver includes a phase shifter and a combiner circuit. The phase shifter adjusts the phase of the first polarized signal in response to the phase of the second polarized signal to produce a phase compensated first signal. Preferably, the phase shifter adjusts the phase of the first polarized signal to be substantially aligned with the phase of the second polarized signal. The combiner circuit sums the second polarized signal and the phase compensated first signal to generate a combined polarization received signal. In this manner, the depolarized signals and polarized signals are phase-aligned and then combined to generate an enhanced received signal irrespective of the depolarization characteristics of the received signal.

In a further embodiment of the present invention, spatial diversity reception is combined with polarization diversity reception by separating the first and second differently polarized antennas by at least about one half of a wavelength of the carrier frequency of the transmitted signal. The received signals are phase-aligned and then combined to generate an enhanced received signal irrespective of the multipath characteristics and the depolarization characteristics of the received signal.

BRIEF DESCRIPTION OF THE DRAWINGS

For a more complete understanding of the present invention and the further advantages thereof, reference is now made to the following Detailed Description, taken in conjunction with the Drawings, in which.

DETAILED DESCRIPTION OF THE INVENTION

Figure 1:
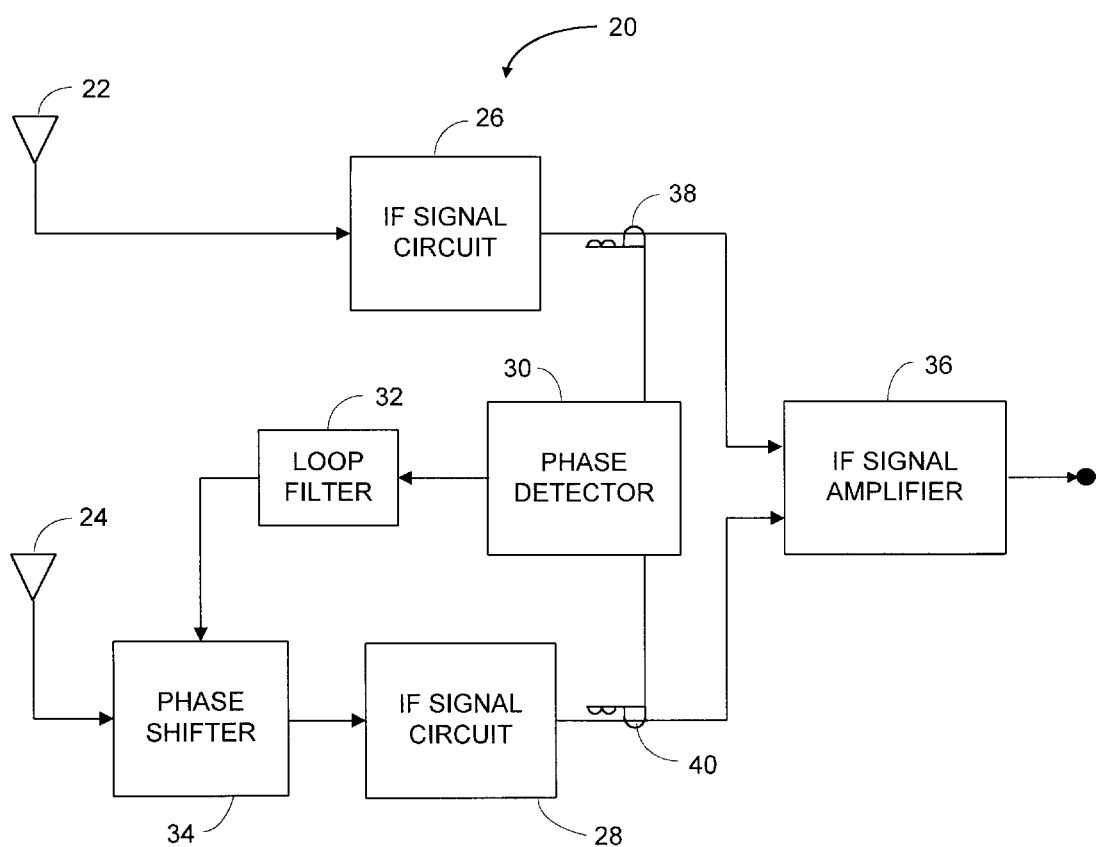
FIG. 1 is a block diagram of a phase-compensated dual polarization receiver according to the present invention.

A phase-compensated dual-polarization receiver 20 according to the present invention is shown in FIG. 1. The receiver 20 is connected to two orthogonally polarized antennas 22 and 24 to receive signals therefrom. The conventional antennas 22 and 24 are adapted to receive linear, circular, or elliptical orthogonally polarized radio-frequency signals. The phase centers of the antennas 22 and 24 can be co-located to provide polarization diversity reception from one antenna structure. Alternatively, the phase centers of the antennas 22 and 24 can be spatially separated by at least one half of a wavelength of the carrier frequency of the transmitted signal to provide both polarization diversity reception and spatial diversity reception. The receiver 20 includes two intermediate frequency (IF) signal circuits 26 and 28, a phase detector 30, a loop filter 32, a phase shifter 34, and an IF signal amplifier 36.

The signal received from antenna 22 is downconverted by the IF signal circuit 26 to an intermediate frequency signal which is provided to the IF signal amplifier 36. In contrast, the signal received from the other antenna 24 is initially phase shifted by phase shifter 34 so that its phase becomes substantially aligned with the signal received by antenna 22. Next, the phase shifted signal is downconverted by the IF signal circuit 28 to the intermediate frequency and provided to the IF signal amplifier 36. The phase shifter 34 adjusts the phase of the signal in response to a phase error signal which is generated by the phase detector 30. The phase shifter 34 can include the digital phase shifter integrated circuit which is manufactured by General Microwave Company as part number 7720A or a similar device.

The phase detector 30 is inductively coupled to the output of the IF signal circuits 26 and 28, at nodes 38 and 40, to sense the downconverted IF signals. The phase detector 30 detects any phase difference between the sensed IF signals and outputs the phase error signal to the phase shifter 34 to drive the phase difference between the IF signals to zero.

Figure 2:
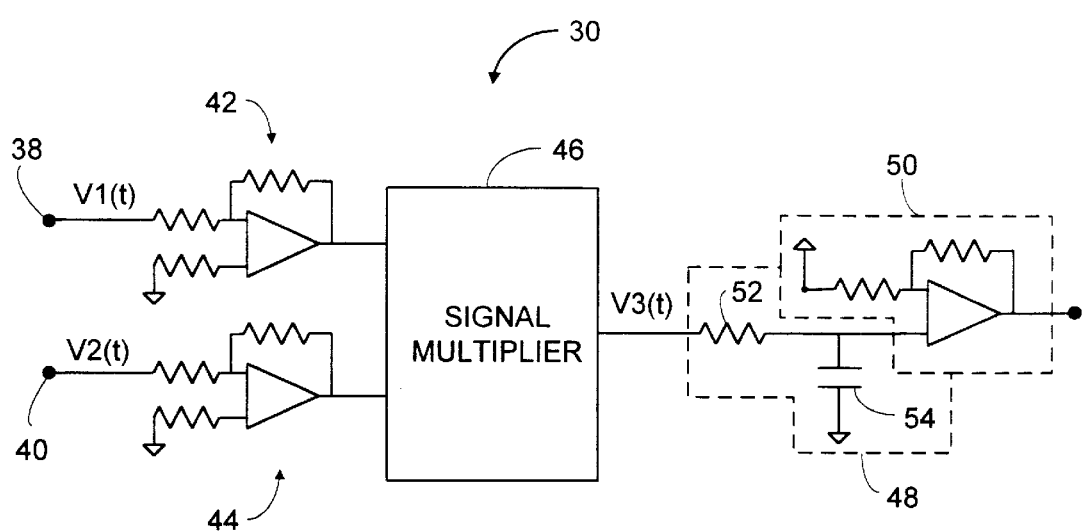
FIG. 2 is a circuit diagram of the phase detector which is shown in FIG. 1.

With reference to FIG. 2, the phase detector 30 includes two small signal amplifiers 42 and 44, a signal multiplier 46, a low pass filter 48, and a DC amplifier 50. The small signal amplifiers 42 and 44 are inductively coupled, at nodes 38 and 40, to the output of the IF signal circuits 26 and 28 (FIG. 1) to sense the IF signals. The sensed IF signals which are provided to the small signal amplifiers 42 and 44 can be represented as follows:

$$V_1(t) = A \cos[W_{LO}t + \theta_1(t) + 90]$$

where:

$V_1(t)$ = The sensed IF signal from the IF signal circuit 26;

A = Amplitude of $V_1(t)$;

$W_{LO}$ = Local oscillator frequency of IF signal circuits 26 and 28;

$\theta_1(t)$ = Phase angle of $V_1(t)$; and

90 = degrees phase shift caused by the inductive coupling to the IF signal circuit.

$$V_2(t) = B \cos[W_{LO}t + \theta_2(t) + 90]$$

where:

$V_2(t)$ = The sensed IF signal from the IF signal circuit 28;

B = Amplitude of $V_2(t)$;

$W_{LO}$ = Local oscillator frequency of IF signal circuits 26 and 28;

$\theta_1(t)$ = Phase angle of $V_1(t)$; and

90 = degrees phase shift caused by the inductive coupling to the IF signal circuit.

The amplified IF signals from the small signal amplifiers 42 and 44 are multiplied by the signal multiplier 46 to provide the following signal to the low pass filter 48:

$$V_3(t) = ABC \cos[\theta_1(t) - \theta_2(t) + 90] + ABC \cos[2W_{LO}t + \theta_1(t) + \theta_2(t) + 90]$$

where:

$V_3(t)$ = multiplied IF signal generated by the signal multiplier 46; and

C = gain product of the small signal amplifiers 42 and 44 and the signal multiplier 46.

The signal multiplier 46 can include conventional integrated circuitry for multiplying signals, such as part number MPY634 which is manufactured by Burr Brown Company or a similar device.

The low pass filter 48 is a conventional resistor 52 and capacitor 54 combination, as shown in FIG. 2, which substantially shorts the double frequency component of the multiplied IF signal, $V_{AC}(t) = ABC \cos[2W_{LO}t + \theta_1(t) + \theta_2(t) + 90]$, to ground while passing the DC component of the multiplied IF signal, $V_{DC}(t) + ABC \cos[\theta_1(t) - \theta_2(t) + 90]$, to the DC signal amplifier 50. The DC component of the multiplied IF signal is referred to as the phase error signal.

The magnitude of the phase error signal is indicative of any phase difference between the sensed IF signals and, consequently, any phase difference between the signals received by the orthogonally polarized antennas 22 and 24. The magnitude of the phase error signal is zero when the IF signals from the IF signal circuits 26 and 28 are substantially aligned and is a maximum when the IF signals are 90 degrees out of phase. In this manner, the phase detector 30 controls the phase shifter 34 (FIG. 1) to drive the phase difference between the IF signals to zero and, thereby, provide substantial alignment between the IF signals.

The phase error signal is amplified by the DC amplifier 50 and provided to the loop filter 32 (FIG. 1). With reference again to FIG. 1, the phase error signal is smoothed by the loop filter 32 to increase the stability of the phase control loop, which is formed by the phase detector 30, loop filter 32, phase shifter 34, and IF signal circuit 28, in driving any phase difference between the IF signals to zero. The loop filter 32 includes conventional integration circuitry such as a capacitor and resistor network (not shown).

The substantially aligned IF signals from the IF signal circuits 26 and 28 are summed and amplified by a conventional IF signal amplifier 36 to form a combined polarization signal. The combined polarization signal is provided to conventional signal processing circuitry (not shown) for demodulation and other processing required by the communications device in which the receiver 20 is utilized.

In this manner, the receiver 20 compensates for multi-path characteristics and depolarization characteristics of the received signals. The antennas 22 and 24 are cross-polarized to receive the depolarized and polarized components of the received signal and are spatially separated to avoid any destructive interaction of the received multipath signals. The received signals are phase-aligned and then combined to generate an enhanced received signal irrespective of the depolarization or multipath characteristics of the received signal.

While the invention has been described in connection with what is presently considered to be the preferred embodiment, it is to be understood that the invention is not to be limited to the disclosed embodiment, but to the contrary, is intended to cover various modifications and equivalent arrangements included within the spirit and scope of the appended claims.

What is claimed is:

1. A receiver for use with a first antenna which receives first polarized signals and a second antenna which receives second polarized signals, the first polarized signals having a substantially different polarization than the second polarized signals, said first polarized signals and said second polarized signals being depolarized components of an original transmitted signal, the receiver comprising:

a phase shifter for adjusting the phase of the first polarized signal to produce a phase compensated first signal;

a phase detector connected to the phase shifter to receive the phase compensated first signal and to the second antenna to receive the second polarized signal;

a combiner circuit connected to the second antenna to receive the second polarized signal and to the phase shifter to receive the phase compensated first signal, the combiner circuit constructively summing the second polarized signal and the phase compensated first signal to generate a combined polarization received signal.

2. The receiver according to claim 1, wherein:

the first polarized signal is horizontally polarized; and the second polarized signal is vertically polarized.

3. The receiver according to claim 1, wherein:

the first polarized signal is right circularly polarized; and the second polarized signal is left circularly polarized.

4. The receiver according to claim 1, wherein:

the first polarized signal is elliptically polarized with a first major axis; and the second polarized signal is elliptically polarized with a second major axis which is orthogonal to the first major axis of the first polarized signal.

5. The receiver according to claim 1, wherein:

the phase shifter substantially aligns the phase of the first polarized signal with the phase of the second polarized signal to generate the phase compensated first signal.

6. The receiver according to claim 1, wherein the phase shifter comprises:

a signal multiplier which multiplies the first polarized signal and the second polarized signal to generate a phase error signal which is indicative of any phase difference between the first polarized signal and the second polarized signal.

7. The receiver according to claim 6, wherein the phase shifter further comprises:

a phase adjusting circuit, connected to the signal multiplier, which adjusts the phase of the first polarized signal in response to the phase error signal.

8. The receiver according to claim 6, wherein the phase shifter further comprises:

a low pass filter, connected to receive the phase error signal from the signal multiplier, which removes substantially all alternating cycle signals in the phase error signal and passes the remaining direct current phase error signal; and a phase adjusting circuit which adjusts the phase of the first polarized signal in response to the direct current phase error signal.

9. The receiver according to claim 1, wherein:

the phase shifter is connected to the first and second antennas which are spatially separated by at least one half of a wavelength of the received first and second polarized signals.

10. A method for combining signals from a first antenna which receives first polarized signals and a second antenna which receives second polarized signals, where the first polarized signals have a substantially different polarization than the second polarized signals, the method comprising the steps of:

determining the phase difference between the first polarized signal and the second polarized signal;

adjusting the phase of the first polarized signal in response to the determined phase difference between the first polarized signal and the second polarized signal; and multiplying the adjust first polarized signal and the second polarized signal to generate a combined polarization received signal, wherein said second polarized signal is constructively added to said phase compensated first polarized signal.

11. The method of claim 10, wherein the first polarized signal is horizontally polarized and the second polarized signal is vertically polarized.

12. The method of claim 10, wherein the first polarized signal is right circularly polarized and the second polarized signal is left circularly polarized.

13. The method of claim 10, wherein the first polarized signal is elliptically polarized with a first major axis and the second polarized signal is elliptically polarized with a second major axis which is orthogonal to the first major axis of the first polarized signal.

14. The method of claim 10, wherein the step of determining the phase difference comprises the step of:

multiplying the first polarized signal and the second polarized signal to generate a phase error signal which is indicative of the phase difference between the first and second polarized signals.

15. The method of claim 14, wherein the step of adjusting the phase of the first polarized signal comprises the step of:

substantially aligning the phase of the first polarized signal with the phase of the second polarized signal.

\* \* \* \* \*